United States Patent
Uemura et al.

(10) Patent No.: US 7,240,759 B2
(45) Date of Patent: Jul. 10, 2007

(54) TRANSMISSION CASE HOUSING A TRANSMISSION MECHANISM FOR TRANSMITTING POWER TO DIRIGIBLE WHEELS

(75) Inventors: Katsuhiko Uemura, Sakai (JP); Shoso Ishimori, Sakai (JP)

(73) Assignee: Kubota Corporation, Osaka (JP)

( * ) Notice: Subject to any disclaimer, the term of this patent is extended or adjusted under 35 U.S.C. 154(b) by 469 days.

(21) Appl. No.: 10/793,684

(22) Filed: Mar. 4, 2004

(65) Prior Publication Data

US 2004/0262070 A1   Dec. 30, 2004

(30) Foreign Application Priority Data

Jun. 26, 2003   (JP) .............................. 2003-182993

(51) Int. Cl.
*B60K 17/00* (2006.01)
*B60K 17/30* (2006.01)

(52) U.S. Cl. .................. 180/343; 180/348; 180/371

(58) Field of Classification Search ................ 180/378, 180/343, 348, 371, 372, 356, 361, 362, 363
See application file for complete search history.

(56) References Cited

U.S. PATENT DOCUMENTS

| | | | |
|---|---|---|---|
| 4,723,398 A | | 2/1988 | Flenniken et al. |
| 4,781,259 A | * | 11/1988 | Yamaoka et al. ........... 475/230 |
| 5,628,171 A | | 5/1997 | Stewart et al. |
| 6,675,925 B2 | * | 1/2004 | Takahashi et al. .......... 180/266 |

FOREIGN PATENT DOCUMENTS

| | | |
|---|---|---|
| DE | 29 40 289 | 10/1980 |
| JP | 59 202909 | 11/1984 |
| JP | 7-17203 | 1/1995 |
| JP | 10-250391 | 9/1998 |

\* cited by examiner

*Primary Examiner*—Paul N. Dickson
*Assistant Examiner*—Joseph Rocca
(74) *Attorney, Agent, or Firm*—The Webb Law Firm (57) ABSTRACT

A transmission case housing a transmission mechanism for transmitting power to dirigible wheels includes an axle case having a main body and vertical bosses extending in a bent way from opposite ends of the main body, and pivoting cases supporting axles of the dirigible wheels. The axle case (8) is bisected into a first case half (8F) and a second case half (8R) at a split plane parallel to a direction of extension of the transmission mechanism (S) housed therein. The first case half (8F) and second case half (8R) are connected by connecting bolt (38). Each vertical boss (8b) has bearings (26), and each pivoting case (25) is attached to the bearings (26) to be pivotable relative to the vertical boss (8b).

7 Claims, 9 Drawing Sheets

TRANSMISSION CASE HOUSING A TRANSMISSION MECHANISM FOR TRANSMITTING POWER TO DIRIGIBLE WHEELS

BACKGROUND OF THE INVENTION

1. Field of the Invention

This invention relates to a transmission case housing a transmission mechanism for transmitting power to dirigible wheels of a relatively small working vehicle such as a lawn mower, agricultural tractor or rice planter.

2. Description of the Related Art

Generally, the transmission case noted above includes an axle case having a main body and vertical bosses extending in a bent way from opposite ends of the main body, and pivoting cases supporting axles of the dirigible wheels. In the case of a tractor, as disclosed in Japanese Unexamined Patent Publication H10-250391, and in the case of a riding rice planter, as disclosed in Japanese Unexamined Patent Publication H7-17203, the pivoting cases supporting the axles of dirigible front wheels are attached to the vertical bosses at the right and left ends of the axle case to be pivotable about vertical axes. Power is transmitted from a cross transmission shaft extending through the axle case to the axles in the pivoting cases through vertical transmission shafts extending along the vertical axes.

In the conventional construction noted above, the main body and the vertical bosses of the axle case are separate components interconnected through flanges to allow assembly into the case of transmission shafts and bevel gears. However, the main body of the axle case is formed as a linear tube, and the vertical bosses are formed as short tubes bent at approximately right angles (in the shape of elbows). The components assembled into these tubular members are subject to restrictions as to outside diameter and assembled position. This leads to a disadvantage of requiring an excessively large inside diameter of the transmission case.

SUMMARY OF THE INVENTION

Having regard to the disadvantage of the prior art noted above, an object of this invention is to provide a transmission case housing a transmission mechanism for transmitting power to dirigible wheels, which transmission case allows interior components of appropriate outside diameters to be incorporated into appropriate positions.

The above object is fulfilled, according to this invention, by an axle case bisectable into a first case half and a second case half at a split plane parallel to a direction of extension of a transmission mechanism housed therein, wherein the first case half and second case half are connected by connecting bolts With the above construction, the axle case including vertical bosses may be split into halves to open up the entire axle case. After assembling components such as bearings, gears, and transmission shafts into predetermined positions within this opened case, the two split cases may be joined and connected with bolts. In this case, components larger than the diameter of end openings of the axle case assembled may be incorporated. There is no restriction such as of having to place the smaller components in positions the deeper away from the end openings. Thus, it is now easy to install interior parts of desired sizes in desired positions, which is advantageous in improving assembling efficiency.

Furthermore, in the transmission case according to this invention, a main body of the axle case houses transverse transmission shafts of the transmission mechanism, the vertical bosses of the axle case house vertical transmission shafts of the transmission mechanism, and pivoting cases house gears for transmitting power from the vertical transmission shafts to the axles. Since the pivoting cases are mounted on the vertical bosses split into halves, it is difficult to connect the split vertical bosses with bolts. In the above construction, however, the bearings which support each pivoting case is mounted on each vertical boss, and this reliably prevents the split vertical boss from spreading loose from each other. That is, the bearings which support the pivoting case are mounted on the vertical boss, to secure strength for the vertical boss which cannot be fastened tight by bolt connection. Thus, despite the split construction, the vertical boss can fully function as such.

Regarding the arrangement of the transmission mechanism in this transmission case, the transverse transmission shafts and the vertical transmission shafts may center lines thereof located on the split plane. This provides optimal stability.

In a preferred embodiment of this invention, each of the vertical bosses has vertical ribs formed on an inner surface thereof and extending along a vertical axis. Then, the vertical bosses, despite the split construction, have excellent bending strength. That is, the split vertical bosses tending to lack in strength may be reinforced by forming the vertical ribs therein. Such vertical bosses can reliably transmit a propelling force to the axle cases.

In a further preferred embodiment, each of the vertical bosses has a sleeve mounted therein. In this construction, each split vertical boss is supported by the sleeve in contact with the inner peripheral surface, and is closed by the bearings mounted on the outer peripheral surface. These components assure bending strength of the vertical boss.

In a different aspect of the invention, a transmission case has a first projection formed integrally with an intermediate region of the first case half, and a second projection formed in a position of the second case half corresponding to the first projection. The first projection and the second projection act as rolling fulcrum shafts. With this construction, the transmission case may be manufactured simply, which is suitable for connection to a vehicle body to be capable of rolling motion.

Other features and advantages of this invention will be apparent from the following description of the embodiment to be taken with reference to the drawings.

DESCRIPTION OF THE PREFERRED EMBODIMENTS

Figure 1:
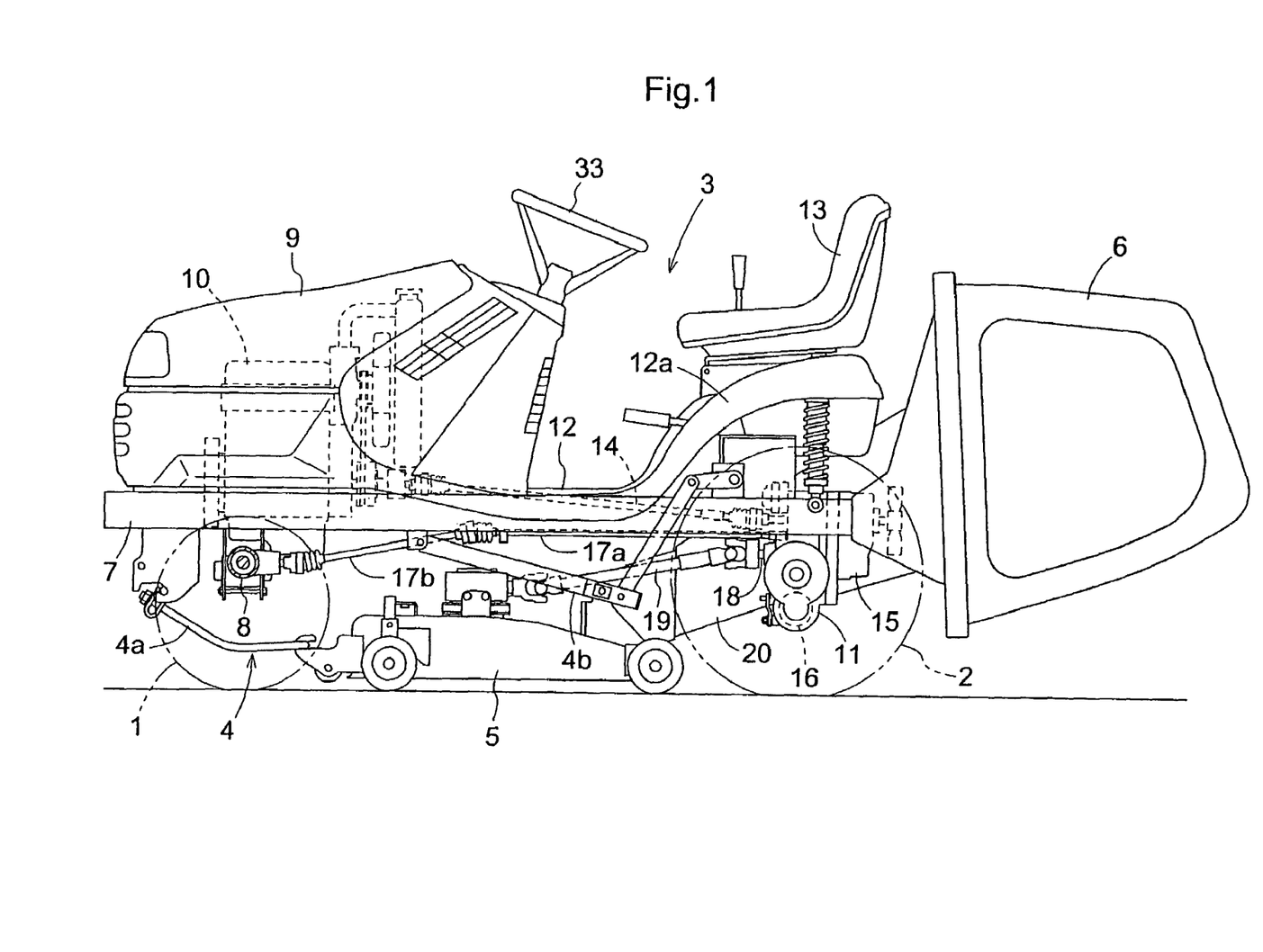
FIG. 1 is a side elevation of a riding lawn mower.

FIG. 1 shows a side elevation of a riding lawn mower which is one example of working vehicle having a transmission case according to this invention. This riding lawn mower is the four-wheel drive type having front drive wheels 1 and rear drive wheels 2. Its vehicle body 3 has a mower unit 5 suspended from a lower position thereof, to be capable of vertical parallel movement, through a four-point link mechanism 4 having front links 4a and rear links 4b. A grass catcher 6 is connected to the rear of the vehicle body 3 for collecting grass clippings cut by the mower unit 5.

The vehicle body 3 includes a pair of right and left main frames 7 having an axle case 8, which is one of the compositions of the transmission case, connected to forward positions thereof to be capable of rolling motion, with the front wheels 1 dirigibly attached to the right and left sides of the axle case 8. An engine 10 covered by a hood 9 is mounted on the main frames 7. A transmission case 11 having the right and left rear wheels 2 is fixed to rear positions of the main frames 7. A step 12 is mounted on the main frames 7, and a driver's seat 13 is disposed between right and left fenders 12a formed integrally with the rear of the step 12.

Figure 2:
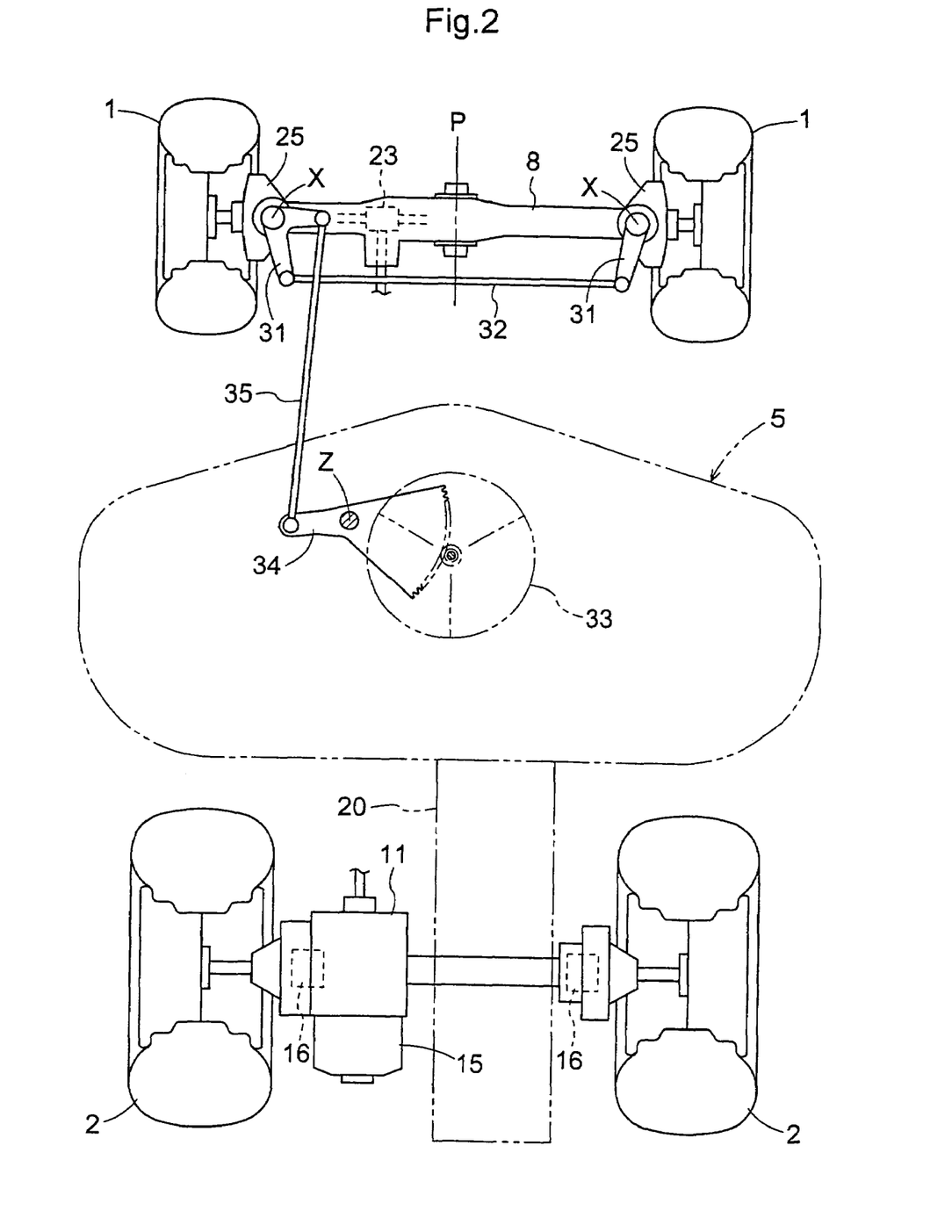
FIG. 2 is a plan view of a propelling transmission system.
Figure 3:
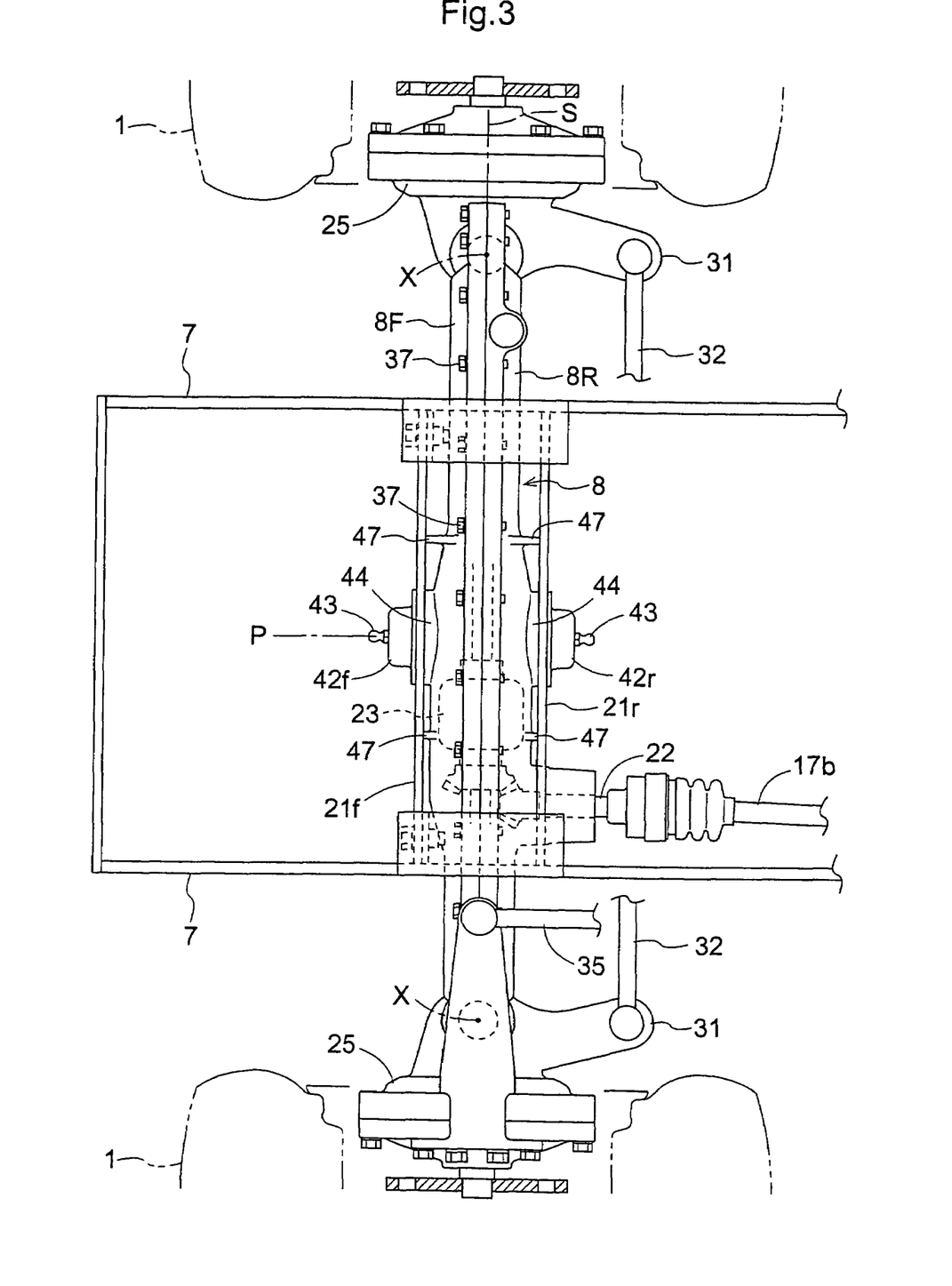
FIG. 3 is a plan view of a front wheel support structure.

Output of the engine 10 is inputted to the transmission case 11 through a transmission shaft 14, and branched therein to a propelling system and a working system. Power in the propelling system is inputted to a hydrostatic stepless transmission (HST) 15 connected to the rear end of the transmission case 11, which is capable of forward and backward drive switching. Variable speed power in forward rotation (for forward drive) or in reversed rotation (for backward drive) from the stepless transmission 14 is transmitted to the right and left rear wheels 2 through side clutches 16, and to the axle case 8 through transmission shafts 17a and 17b extending forward along and under the vehicle body. Thus, the front wheels 1 and rear wheels 2 are driven at synchronized speeds. This embodiment provides mainly a transmission case as a case housing a transmission mechanism for transmitting power to the front wheels 1 acting as dirigible wheels. The transmission case is formed of the axle case 8 and pivoting cases 25.

Power for the working system branched within the transmission case is taken from a PTO shaft 18 projecting from the front surface of the transmission case, and is transmitted to the mower unit 5 through a transmission shaft 19.

The transmission case 11 is offset to the left side relative to the vehicle body 3. A duct 20 for guiding grass clippings from the mower unit 5 to the grass catcher 6 is disposed in a space formed under the vehicle body by the offset location of the transmission case 11.

Figure 4:
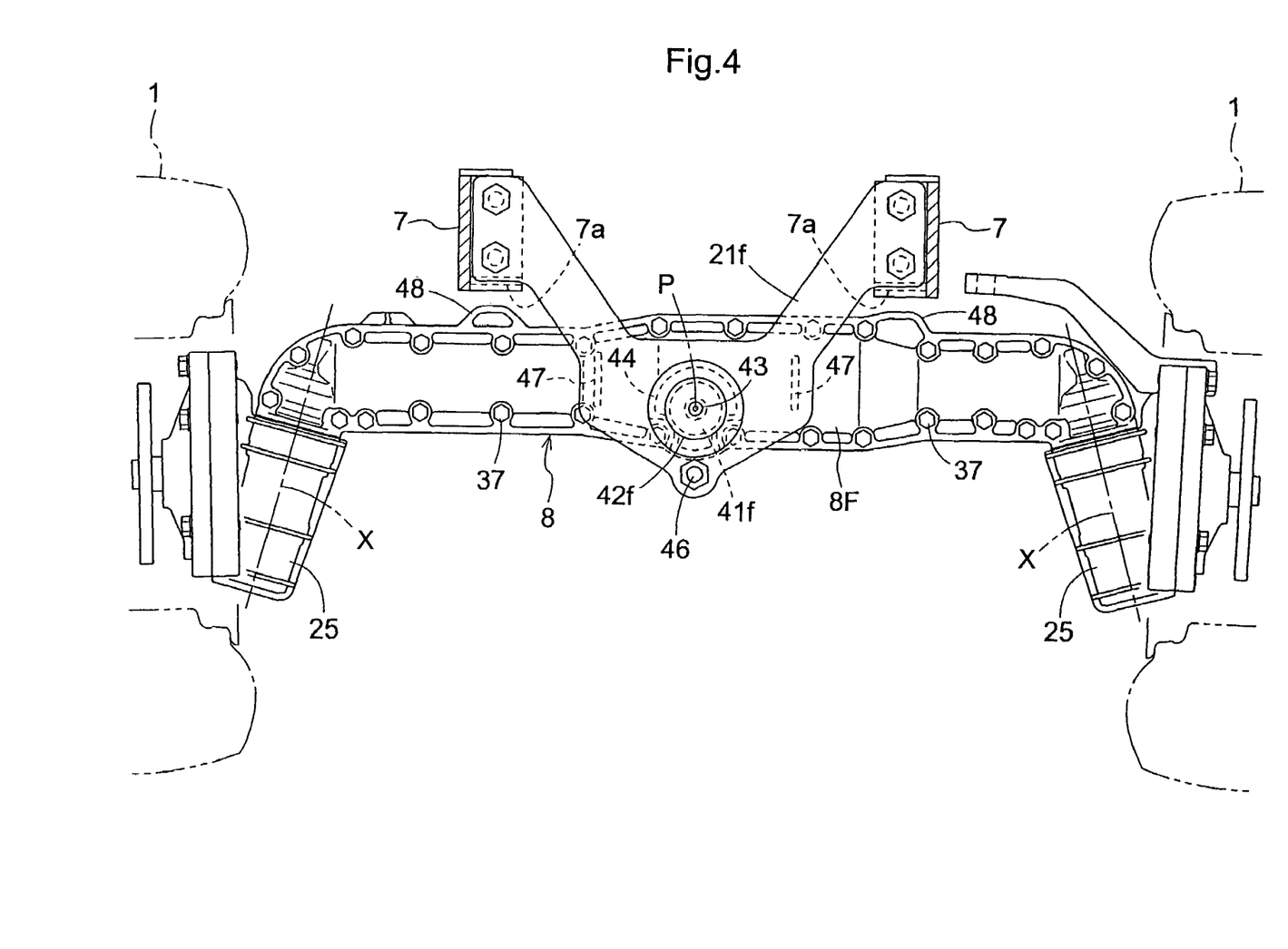
FIG. 4 a front view of the front wheel support structure.
Figure 5:
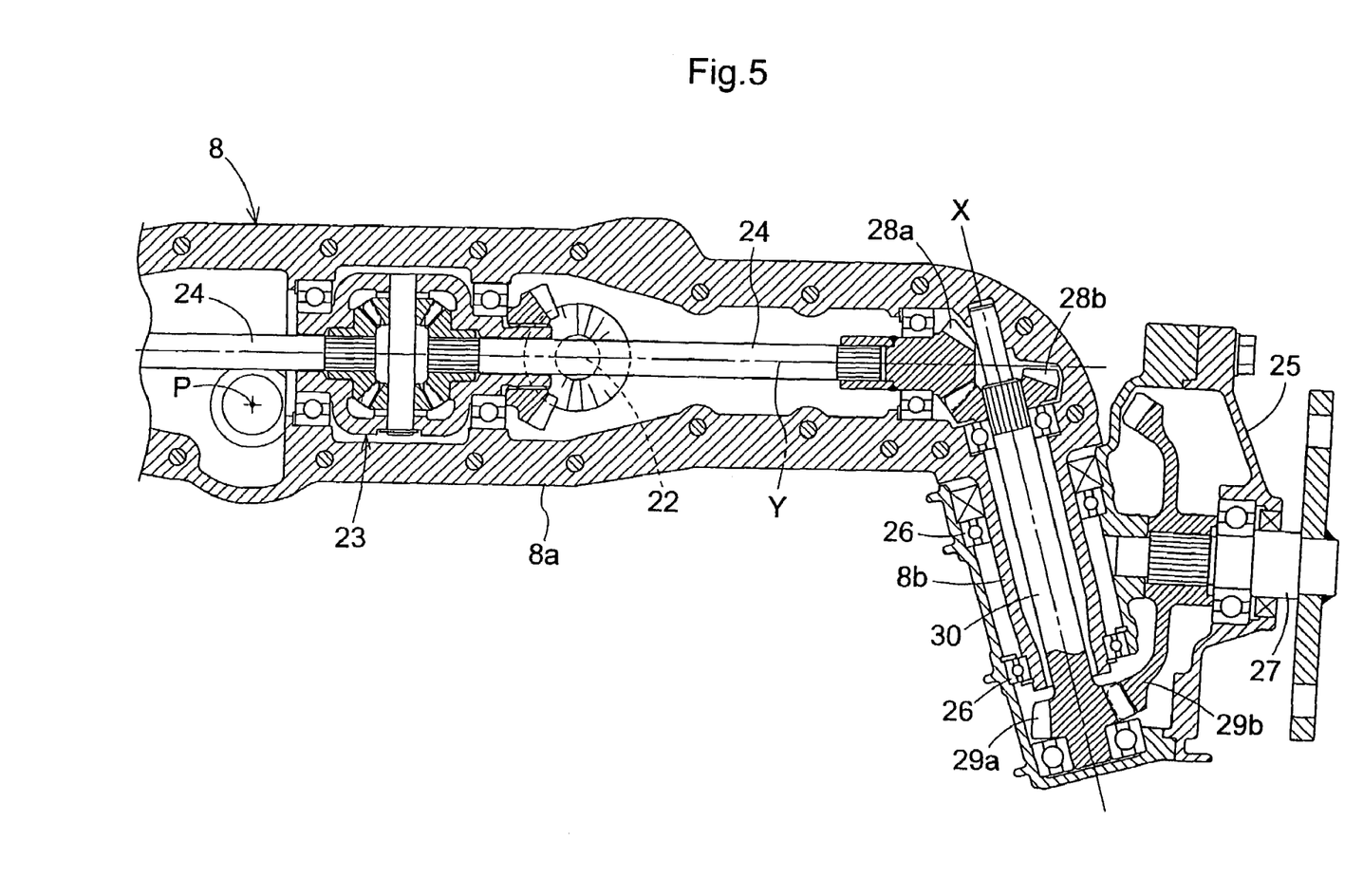
FIG. 5 is a front view in vertical section of an axle case.

As shown in FIGS. 4 and 5, the axle case 8 includes a sideways elongated axle case main body 8a and vertical bosses 8b at the right and left ends thereof. The axle case 8 is supported in a middle position in the right and left direction by a pair of front and rear support brackets 21f and 21r attached to lower front positions of the main frames 7, to be rollable about a fore-and-aft axis P. Power of the propelling system is transmitted to an input shaft 22 disposed in a position sideways offset from this rolling axis P. The power inputted is branched to right and left transverse transmission shafts 24 through a differential mechanism 23. The pivoting cases 25 are fitted on the vertical bosses 8b formed integrally with the right and left ends of the axle case 8, each through a pair of upper and lower roller bearings 26, to be pivotable about vertical axes X. The transverse transmission shafts 24 extending right and left from the differential mechanism 23, and axles 27 mounted in horizontal posture in the pivoting cases 25 are interlocked for reduction, each through two sets of bevel gears 28a, 28b, 29a and 29b and a vertical transmission shaft 30 extending along the vertical axis X.

As shown in FIG. 2, knuckle arms 31 attached to upper ends of the right and left pivoting cases 25 are connected to each other by a tie rod 32. A pitman arm 34 pivotable about a fulcrum Z by a steering wheel 33 is interlocked to the left knuckle arm 31 through a drag link 35. These components constitute a front wheel steering system.

The axle case 8 has a front and rear split structure formed by aluminum die casting. Its details are shown in FIGS. 6 through 10. Specifically, the axle case 8 includes front and rear split case portions 8F and 8R with a dividing plane S including the axis Y of the transverse transmission shafts 24 and the axes X of the vertical transmission shafts 30, and with peripheral surfaces thereof mating through flanges and fixed together by tightening bolts 37 in the fore-and-aft direction. Bolts are not usable for tightening the vertical bosses 8b having the pivoting cases 25 fitted thereon. However, rigidity is secured for each boss 8b by press-fitting the upper and lower bearings 26, for pivotably supporting the pivoting case 25. Each vertical boss 8b has vertical ribs 38 formed inside and extending along the vertical axis to increase its bending rigidity.

Figure 6:
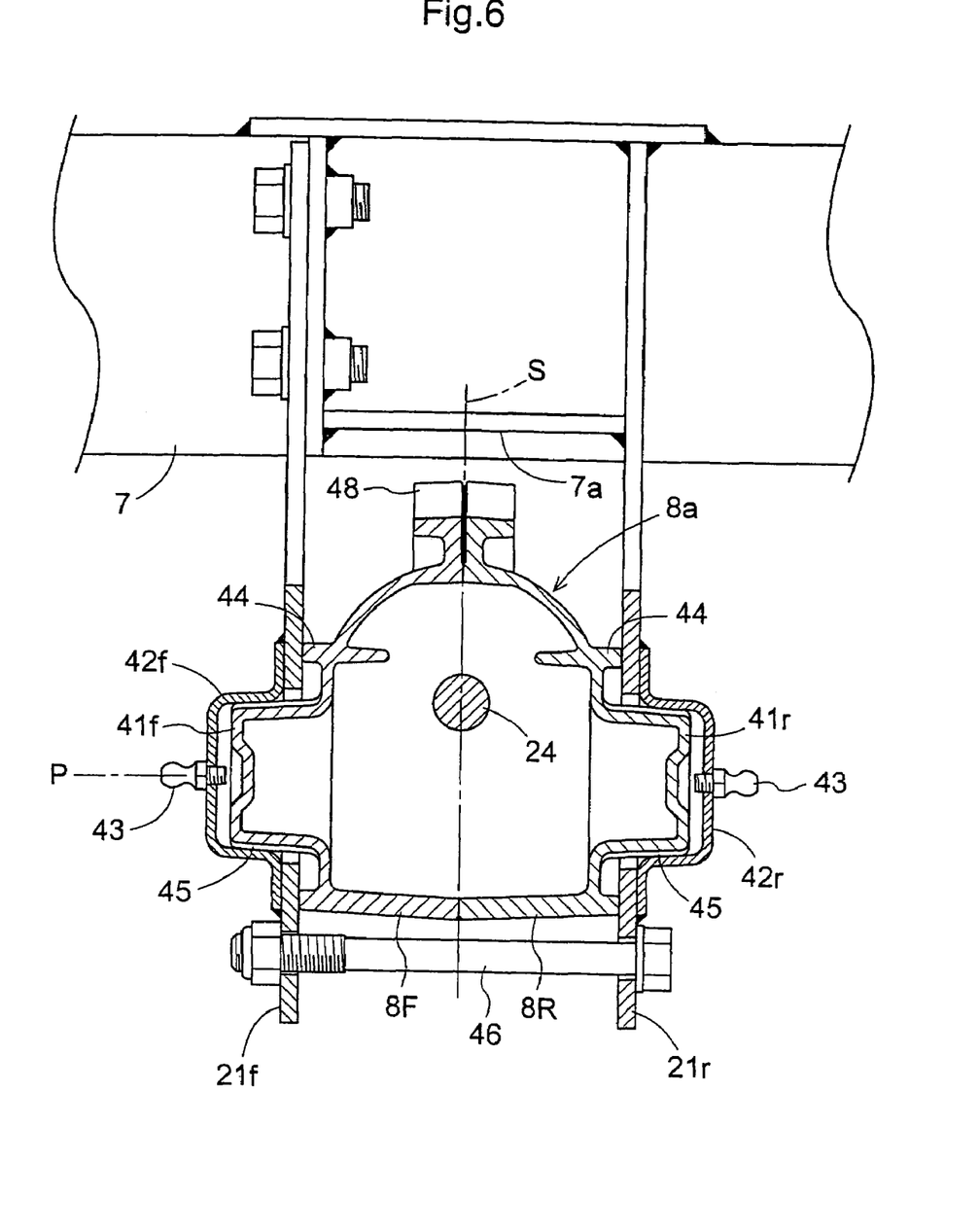
FIG. 6 is a side view in vertical section showing a rolling fulcrum structure of the axle case.
Figure 7:
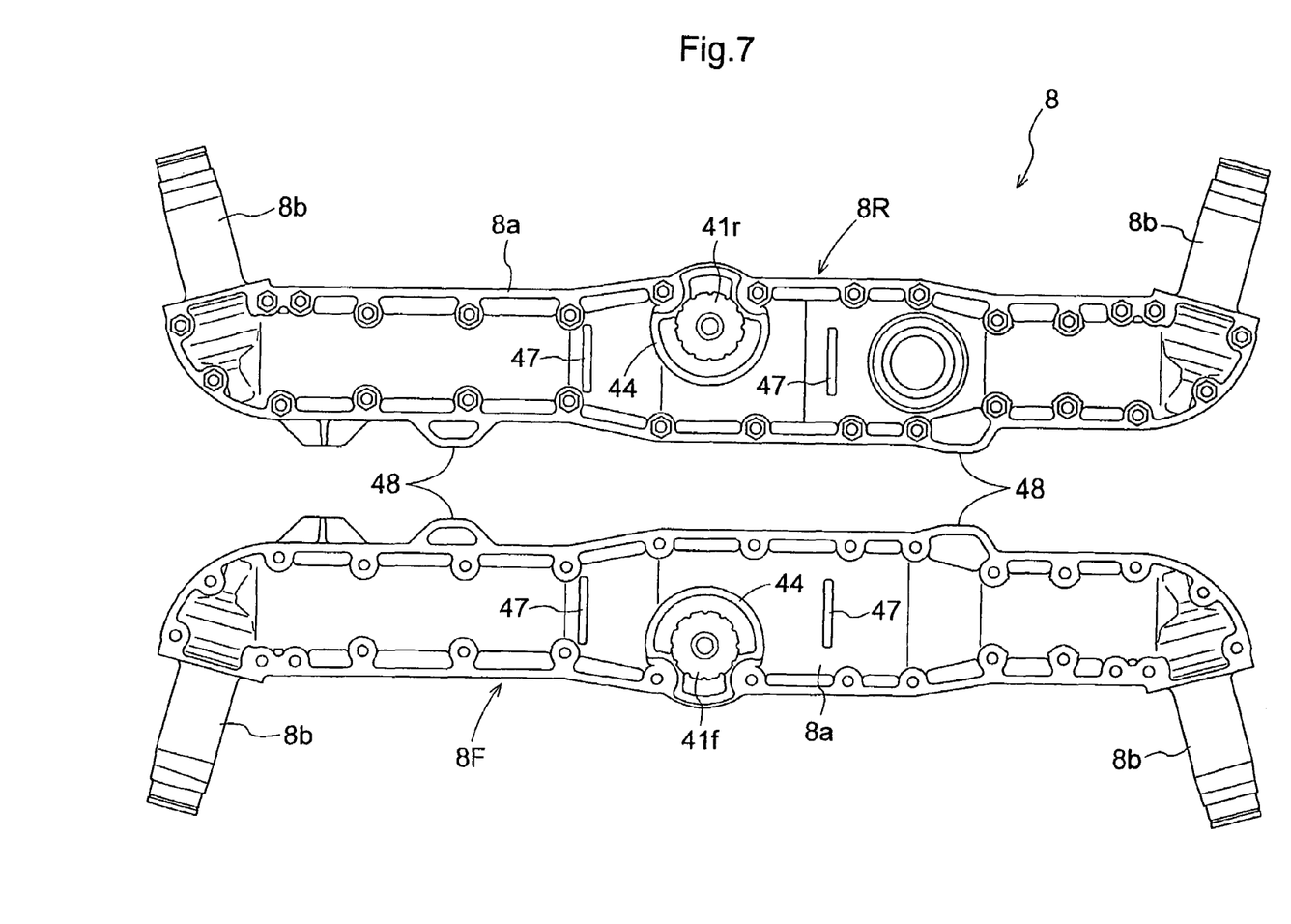
FIG. 7 is a development of split case portions forming the axle case.
Figure 8:
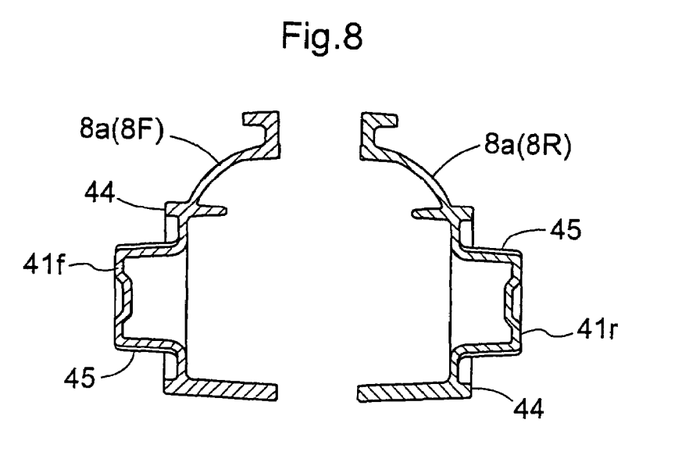
FIG. 8 is a side view in vertical section of the split case portions forming the axle case.
Figure 9:
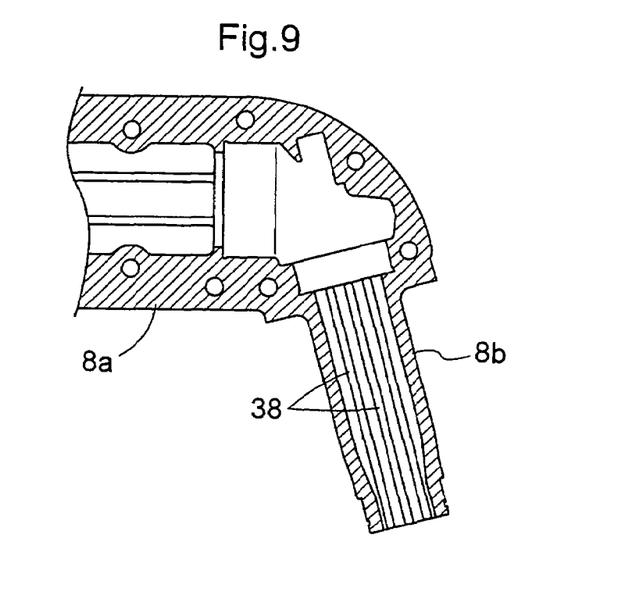
FIG. 9 is a side view in vertical section showing a part of the axle case.
Figure 10:
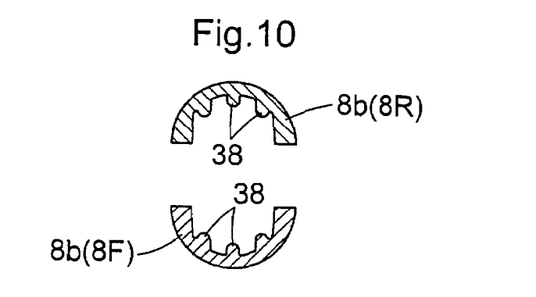
FIG. 10 is a cross section of a part of the axle case.

The front and rear split case portions 8F and 8R have rolling fulcrum shafts 41f and 41r formed in transversely middle positions on outer surfaces thereof. The fore and aft fulcrum brackets 21f and 21r have cup-shaped fulcrum bosses 42f and 42r rigidly welded thereto as inwardly opposed to each other for rotatably receiving and supporting the rolling fulcrum shafts 41f and 41r. The rolling fulcrum shafts 41f and 41r are slightly tapered, while the fulcrum bosses 42f and 42r also are tapered toward the deep ends thereof at the same taper angle. A grease nipple 43 is attached to the end of each of the fulcrum bosses 42f and 42r. The split case portions 8F and 8R have annular projections 44 formed on the outer surfaces thereof to surround the rolling fulcrum shafts 41f and 41r and in tight contact with the inner surfaces of the front and rear fulcrum brackets 21f and 21r, thereby forming fluid-tight oil sumps inside the fulcrum bosses 42f and 42r. A plurality of axial oil grooves 45 are formed in outer peripheral surfaces of the rolling fulcrum shafts 41f and 41r to assure a sufficient supply of grease to rolling slide positions.

In order to allow the axle case 8 to be assembled between the front and rear fulcrum brackets 21f and 21r, the rear fulcrum bracket 21r is rigidly welded to the main frames 7, while the front fulcrum bracket 21f is removably connected by bolts. Bolts 46 are mounted between lower ends of the two fulcrums brackets 21f and 21r to prevent the fulcrum brackets 21f and 21r from moving away from each other. A spacing between these brackets is fine adjusted by appropriately tightening the bolts 46, so that the rolling fulcrum shafts 41f and 41r may be received and supported in the fulcrum bosses 42f and 42r free of clattering.

The axle case 8 has projections 47 formed on the front surface and rear surface thereof at opposite sides of the rolling fulcrum P and having the same height has the annular projections 44. These projections 47 are in contact with the inner surfaces of the fulcrum brackets 21f and 21r, whereby a yawing load acting on the axle case 8 is borne by a large span between the right and left projections 47.

Furthermore, the axle case 8 has a pair of ridges 48 formed on an upper surface thereof in positions at right and left sides of the rolling fulcrum P. These ridges 48 are movable upward into contact with stoppers 7*a* formed at the lower ends of the main frames 7 to limit rolling motion of the axle case 8.

OTHER EMBODIMENTS

This invention may be modified as follows:

(1) Where ribs are formed on the inner surfaces of each vertical boss 8*b* for reinforcement, circumferential ribs or criss-cross ribs may be formed besides or as alternative to the vertical ribs 38 extending along the vertical axis noted hereinbefore. The shape and number of ribs may be selected as desired according to load.

Figure 11:
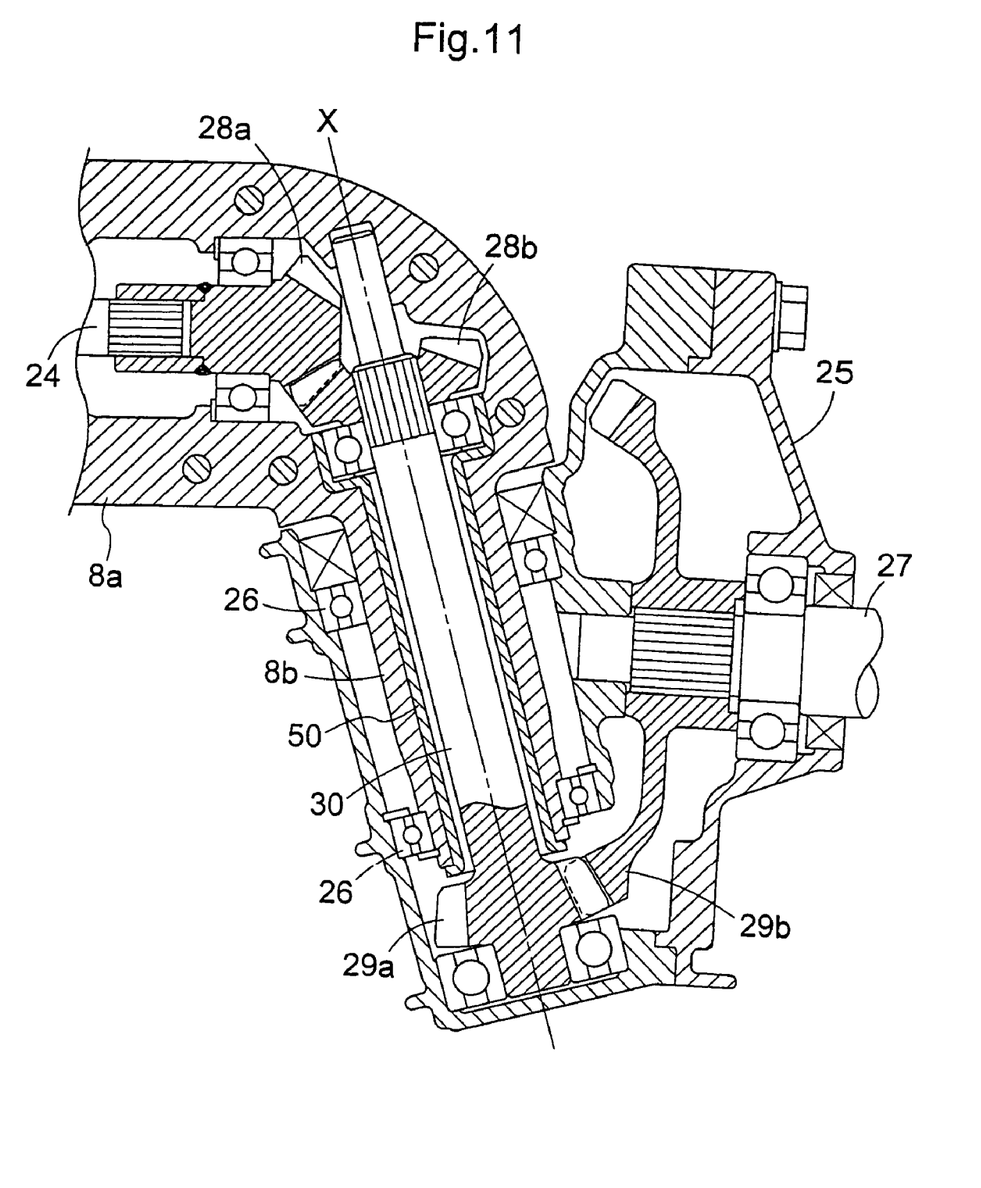
FIG. 11 is a front view in vertical section showing a part of an axle case in another embodiment.

(2) As shown in FIG. 11, a cylindrical sleeve 50 may be tight-fit inside each vertical boss 8B of split structure. This will further promote the bending strength of the vertical boss 8*b*.

(3) This invention is applicable also to a drive structure for dirigible wheels of a riding rice planter or a small tractor besides the riding lawn mower. Where the front wheels are non-dirigible and the rear wheels dirigible, the invention may be applied to the drive structure for the rear wheels.

What is claimed is:

1. A transmission case housing a transmission mechanism for transmitting power to dirigible wheels, comprising:

pivoting cases supporting axles of said dirigible wheels;

an axle case divided into a first case half and a second case half at a split plane parallel to a direction of extension of said transmission mechanism housed therein, said axle case having a main body, a first vertical boss extending at an angle from one end of the main body, and a second vertical boss extending at an angle from the other end of the main body, each of the first and second vertical bosses being integral, one-piece with the main body wherein the split plane is a single flat plane that extends from a free end of the first vertical boss to a free end of the second vertical boss;

connecting bolts for connecting said first case half and said second case half; and a bearing mounted on an outer surface of each of said first and second vertical bosses, the first and second vertical bosses formed by connecting said first case half and said second case half, the bearing additionally holding together the first case half and the second case half, and each of said pivoting cases being attached to a corresponding one of the first and second vertical bosses through said bearing to be pivotable relative thereto.

2. A transmission case as defined in claim 1, wherein said main body of said axle case houses transverse transmission shafts of said transmission mechanism, said vertical bosses of said axle case house vertical transmission shafts of said transmission mechanism, and said pivoting cases house gears for transmitting power from said vertical transmission shafts to said axles.

3. A transmission case as defined in claim 2, wherein said transverse transmission shafts and said vertical transmission shafts have center lines thereof located on said split plane.

4. A transmission case as defined in claim 1, wherein each of said vertical bosses has vertical ribs formed on an inner surface thereof and extending along a vertical axis.

5. A transmission case as defined in claim 1, wherein each of said vertical bosses has a sleeve mounted therein.

6. A transmission case housing a transmission mechanism for transmitting power to dirigible wheels, comprising:

pivoting cases supporting axles of said dirigible wheels;

an axle case divided into a first case half and a second case half at a split plane parallel to a direction of extension of said transmission mechanism housed therein, said axle case having a main body, a first vertical boss extending at an angle from one end of the main body, and a second vertical boss extending at an angle from the other end of the main body, each of the first and second vertical bosses being integral, one-piece with the main body wherein the split plane is a single flat plane that extends from a free end of the first vertical boss to a free end of the second vertical boss;

connecting bolts for connecting said first case half and said second case half;

a first projection formed integrally with an intermediate region of said first case half and projecting in a first direction normal to the split plane, and a second projection formed in a position of said second case half corresponding to said first projection and projecting in a second direction substantially opposite to the first direction, the first projection and the second projection acting as rolling fulcrum shafts; and bearings mounted to outer surfaces of the first and second vertical bosses additionally holding the first and second case halves together and pivotably connecting said pivoting cases to said vertical bosses.

7. A transmission case as defined in claim 6, wherein said bearings are mounted on each of said vertical bosses formed by connecting said first case half and said second case half, each of said pivoting cases being attached to said bearings to be pivotable relative to said vertical boss.

* * * * *